No. 745,060. Patented November 24, 1903.

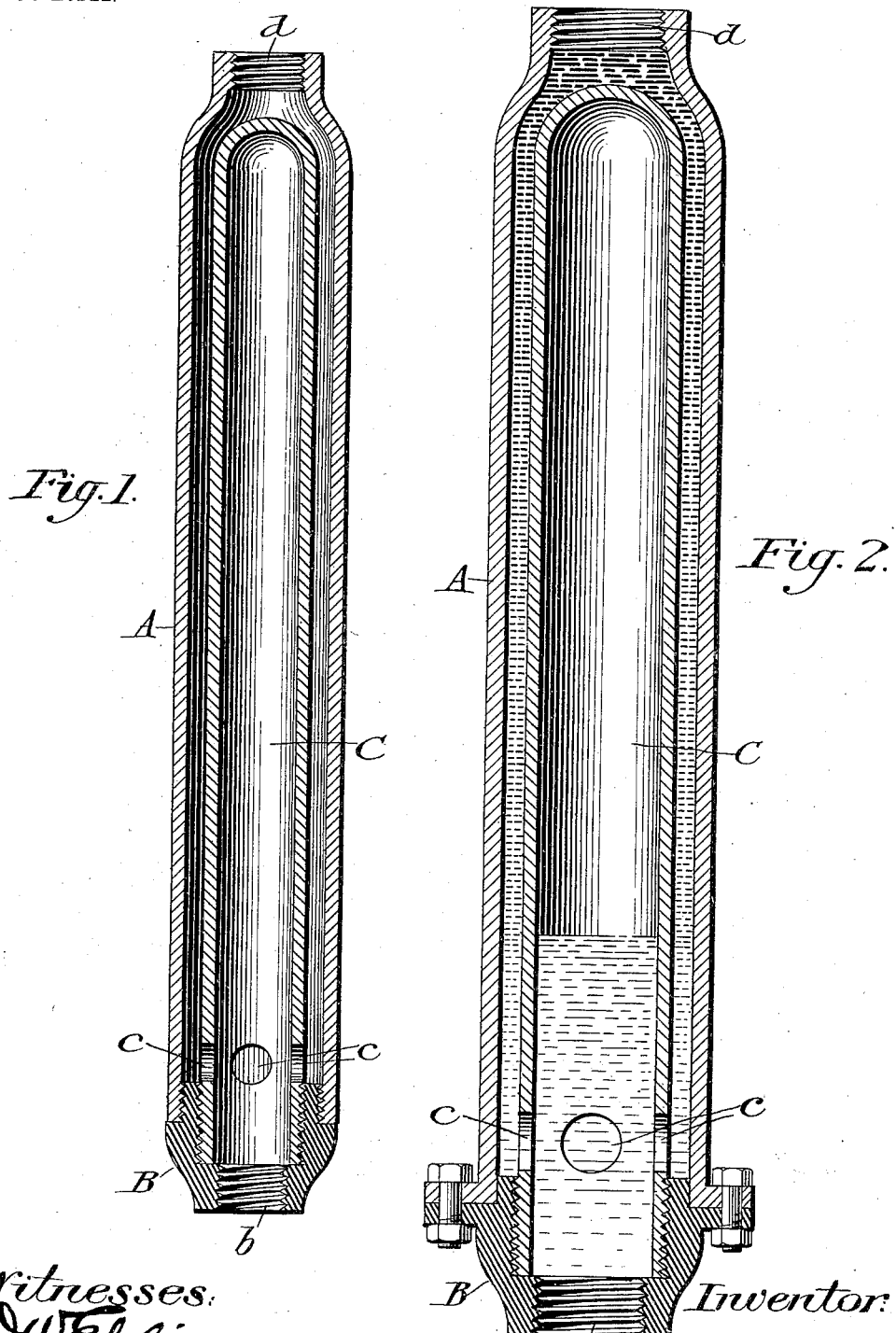

UNITED STATES PATENT OFFICE.

NEVIL MONROE HOPKINS, OF WASHINGTON, DISTRICT OF COLUMBIA, ASSIGNOR TO ANTI-BURSTING PIPE COMPANY, OF PITTSBURG, PENNSYLVANIA, A CORPORATION OF PENNSYLVANIA.

MEANS FOR PROTECTING WATER-PIPES AGAINST BURSTING BY FREEZING.

SPECIFICATION forming part of Letters Patent No. 745,060, dated November 24, 1903.

Application filed February 24, 1902. Serial No. 95,300. (No model.)

*To all whom it may concern:*

Be it known that I, NEVIL MONROE HOPKINS, a citizen of the United States, residing at Washington, District of Columbia, have invented certain new and useful Improvements in Means for Protecting Water-Pipes Against Bursting by Freezing; and I do hereby declare the following to be a full, clear, and exact description of the invention, such as will enable others skilled in the art to which it appertains to make and use the same.

In Letters Patent of the United States No. 616,188, dated December 20, 1898, and No. 626,908, dated June 13, 1899, I have shown and described the protection of water-pipes and the like from bursting by freezing by the expedient of interposing in the pipe system at appropriate intervals pneumatic chambers water-sealed at their bases, and which provide capacities within which the excess of the expanding ice or water column may be received, thereby relieving the bursting strain that would otherwise be exerted on the pipe-walls.

My present invention relates to devices of the same general character, as will hereinafter more fully appear.

In the drawings, Figure 1 represents a vertical or longitudinal sectional view of one form or embodiment of my invention. Fig. 2 represents, on a somewhat larger scale, a similar view of another form or modification thereof.

Similar letters of reference indicate similar parts in both views.

The two forms or modifications shown, as will be readily seen, differ from each other merely in the manner in which the outer chamber or water-passage A is attached to the coupling-piece B, their construction in other respects being the same and their mode of operation being the same.

Broadly considered, the main or leading characteristic feature of my invention consists in locating an air-chamber within a water-conduit system in line with the flow of water therethrough and surrounding or encompassing the air-chamber with a water-passage which communicates with the air-chamber by basal openings, so that there will be formed in alinement with the expanding ice or water column a space into which it can enter freely without the interposition of deflecting ridges or projections, this space being, moreover, of ample capacity and being securely sealed at its base by openings so distributed as to favor the maintenance of the desired air-pressure by entrapping air-bubbles that would otherwise pass by to the outlet-faucets.

In practice I prefer to embody my invention in a fitting capable of separate manufacture and sale and adapted to be inserted between and connected up with adjoining pipe-sections of water-supply system. Thus in the drawings, B indicates a coupling-piece screw-threaded at its inlet end $b$ for attachment to the pipe-section from which it receives its supply. The coupling-piece B is likewise screw-threaded for the reception of the air-chamber C, which is preferably a tube closed at one end and provided at its other end or base with apertures or openings $c$, preferably spaced at small distances about its periphery. Exterior to the air-chamber C is the surrounding water-passage chamber A, separated from it by an intervening water-space, into which the apertures $c$ enter. The chamber A is screw-threaded at $d$ for attachment to the pipe-section into which it discharges. At its other end it is secured to the coupling-piece B in any suitable manner—for instance, as shown in Fig. 1, by a screw-joint or, as shown in Fig. 2, by means of a flange-joint with bolts and nuts.

The operation of the invention is as follows: Assuming the conduit system to be provided between adjoining pipe-sections or at any other suitable intervals with fittings of the kind described, the full inflow of water into the system will seal the openings $c$ throughout the system, and the water will rise in the air-chambers until equilibrium is established between the water-pressure and air-pressure therein, as indicated, for instance, in Fig. 2. If necessary, the pressure within the air-chambers may be augmented at any time by the insufflation of air into the water column, the bubbles of air thus introduced passing the apertures *c* and entering the air-collecting space beyond. The equal distribution or spacing of the apertures about the periphery of the air-chamber is favorable to the entrapping of any air thus introduced or any air which may be otherwise present in the water column, inasmuch as the tendency of any one aperture *c* to divert an air-bubble out into the surrounding water-passage is counteracted in great part by the remaining apertures, with the net result that the great majority of air-bubbles near the center of the water-current pass the apertures *c*. Should the water within the conduit freeze, it will be apparent that the excess of the expanding ice or water column will enter the air-space of the protector, thereby saving the pipe from bursting.

Having thus described my invention, what I claim is—

Means for protecting water-conduit systems from bursting by freezing, consisting of a fitting adapted to be interposed between adjacent pipe-sections of the system, said fitting comprising a tubular air-chamber of a diameter at least equal to that of the system and having a series of apertures at its base, said air-chamber being in alinement with the inlet-pipe section of the system and in full and free communication therewith at the place of juncture, and a surrounding tubular chamber, separated from the air-chamber by an intervening water-passage and communicating therewith by means of the said basal apertures; substantially as described.

In testimony whereof I affix my signature in presence of two witnesses.

NEVIL MONROE HOPKINS.

Witnesses:
EDWIN S. CLARKSON,
JULIA M. WRENN.